W. BRUBAKER.
GEARING.
APPLICATION FILED JAN. 13, 1919.

1,398,255.

Patented Nov. 29, 1921.

Inventor
William Brubaker

Witnesses

By Richard Bowen
Attorney

UNITED STATES PATENT OFFICE.

WILLIAM BRUBAKER, OF TOLNA, NORTH DAKOTA.

GEARING.

1,398,255.　　　　Specification of Letters Patent.　　Patented Nov. 29, 1921.

Application filed January 13, 1919. Serial No. 270,968.

*To all whom it may concern:*

Be it known that I, WILLIAM BRUBAKER, a citizen of the United States, residing at Tolna, in the county of Nelson and State of North Dakota, have invented certain new and useful Improvements in Gearings, of which the following is a specification.

This invention has relation to certain new and useful improvements in mechanical movements.

The primary object of my invention is to provide a power transmission whereby a rotary movement imparted to a fly wheel is in turn imparted to a chain sprocket.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
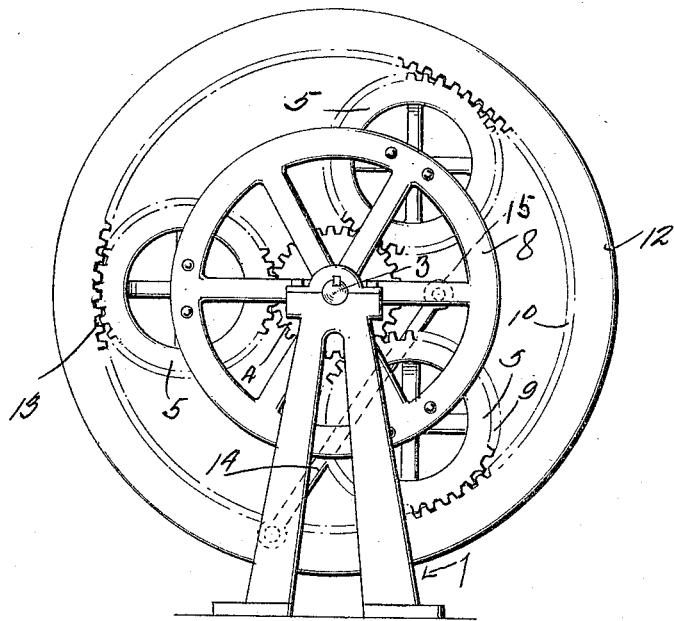
Figure 2:
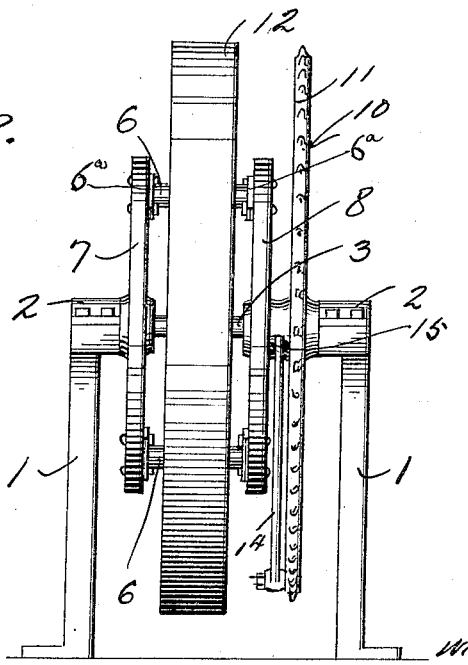

Figure 1 represents a side elevation of the gearing constituting this invention, and Fig. 2 is an end view thereof.

In carrying out the aim of my invention I employ two standards 1, 1, each of which has a bearing 2 at its upper end giving support to a fixed shaft 3, to which are secured two stationary gear wheels 4, 4, while revolubly held adjacent to said gears is the internally toothed fly wheel 12.

Located on opposite side of this fly wheel and the gears 4, 4, are the two carrying wheels 7, and 8, these wheels being revolubly held and carrying the projecting studs 6, 6, extending from the bearings 6ª. In the drawings three such studs are shown though it should be remembered that a greater or less number may be employed. As disclosed these carrying wheels are held in spaced relation to said fly wheel 12, a gear 5 being carried on each of said studs said gears being arranged to mesh with said stationary or fixed gears 4, 4, and the internal teeth 13 in the manner shown.

Held adjacent to the fly wheel 12 is the chain sprocket 10, which has an extending stud 16 to which is held one end of a pitman 14, having its other end held to the stud 15 extending from the wheel 8.

The parts all having been properly arranged the operation of my device is as follows: As the wheel 12 is rotated it imparts a rotary movement to the gears 5, which in turn meshing with the gears 4 are carried in a circular path around the carrying wheels 7 and 8, and the wheel 8 being in pitman connection with the chain sprocket is rotated to drive suitable chain passing over the same.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention what I claim as new and desire to secure by Letters Patent, is:—

A mechanical movement including in combination, two supporting standards, a shaft fixed to the upper end of said standards, an internally toothed fly wheel revolubly held on said shaft, a stationary gear wheel fixed to said shaft, two oppositely positioned carrying wheels revolubly held on said shaft, a plurality of studs on said carrying-wheels, a gear wheel on each of said studs meshing with said fixed gear wheel and said internal gear teeth, a driven sprocket wheel loosely mounted on said shaft adjacent to said fly wheel, and a pitman connecting said driven sprocket wheel to one of said stud-wheels, whereby on rotating said fly wheel, said connected sprocket wheel is rotated, as and in the manner set forth.

In testimony whereof I affix my signature in presence of two witnesses.

WILLIAM BRUBAKER.

Witnesses:
　R. E. ENGEN,
　A. J. JOHNSON.